(12) United States Patent
Hung et al.

(10) Patent No.: US 10,391,595 B2
(45) Date of Patent: Aug. 27, 2019

(54) FLOATING TYPE MACHINING PLATFORM AND FLOATING TYPE MACHINING SYSTEM

(71) Applicant: NOPORVIS CO., LTD., Kaohsiung (TW)

(72) Inventors: Kuo-Kai Hung, Tainan (TW); Chun-Neng Chan, Kaohsiung (TW); Hui-Hung Lin, Tainan (TW)

(73) Assignee: NOPORVIS CO., LTD., Kaohsiung (TW)

( * ) Notice: Subject to any disclaimer, the term of this patent is extended or adjusted under 35 U.S.C. 154(b) by 698 days.

(21) Appl. No.: 15/011,449

(22) Filed: Jan. 29, 2016

(65) Prior Publication Data
US 2017/0165800 A1   Jun. 15, 2017

(30) Foreign Application Priority Data

Dec. 10, 2015  (TW) .............................. 104141603 A (51) Int. Cl.
*B23Q 16/00*  (2006.01)
*B23Q 3/06*  (2006.01)
(Continued)

(52) U.S. Cl.
CPC ............... *B23Q 3/062* (2013.01); *B23Q 1/26* (2013.01); *B23Q 16/024* (2013.01); *B25B 11/00* (2013.01); *Y10T 29/49998* (2015.01)

(58) Field of Classification Search
CPC ........ B23Q 3/062; B23Q 16/024; B23Q 1/26; Y10T 29/49995
See application file for complete search history.

(56) References Cited

U.S. PATENT DOCUMENTS 7,765,662 B2   8/2010   McKown
8,359,741 B2   1/2013   McKown
(Continued)

FOREIGN PATENT DOCUMENTS

CN        1696631 A      11/2005
CN      201979300 U       9/2011
(Continued)

OTHER PUBLICATIONS

CN1696631 English machine translation (Year: 2005).*

*Primary Examiner* — Sarang Afzali
*Assistant Examiner* — Ruth G Hidalgo-Hernandez
(74) *Attorney, Agent, or Firm* — Winston Hsu (57) ABSTRACT

A floating type machining platform includes a base, a holding platform, a first elastic module, a second elastic module and a third elastic module. The holding platform is configured to hold a workpiece. The first elastic module is connected between the base and the holding platform for allowing the holding platform to move along and rotate around a first axis relative to the base. The second elastic module is connected between the base and the holding platform for allowing the holding platform to move along and rotate around a second axis relative to the base. The third elastic module is connected between the base and the holding platform for allowing the holding platform to move along and rotate around a third axis relative to the base. Wherein, the first and the second axes are different horizontal axes, and the third axis is a vertical axis.

9 Claims, 9 Drawing Sheets

(51) Int. Cl.
*B23Q 1/26* (2006.01)
*B25B 11/00* (2006.01)
*B23Q 16/02* (2006.01)

(56) References Cited

U.S. PATENT DOCUMENTS

2003/0150288 A1 8/2003 Noll
2008/0067729 A1 3/2008 McKown

FOREIGN PATENT DOCUMENTS

| CN | 202151779 U | * | 2/2012 |
|----|-------------|---|--------|
| CN | 102708930 A |   | 10/2012 |
| TW | 536442      |   | 6/2003 |
| TW | 200635706   |   | 10/2006 |

* cited by examiner

FLOATING TYPE MACHINING PLATFORM AND FLOATING TYPE MACHINING SYSTEM

BACKGROUND OF THE INVENTION

1. Field of the Invention

The present invention relates to a floating type machining platform, a floating type machining system and a floating type machining method, and more particularly, to a floating type machining platform, a floating type machining system and a floating type machining method capable of improving machining precision.

2. Description of the Prior Art

Generally, for machining a specific workpiece, a corresponding machining device is required. For example, when grinding a round hole of a workpiece, the prior art may utilize a fixture for holding and feeding the workpiece along a horizontal direction, in order to grind an inner surface of the round hole of the workpiece by a tool. However, since the workpiece is held horizontally, the workpiece may easily tilt due to the fixture holding the workpiece at an incorrect position or in an incorrect angle, such that an axis of the tool is not aligned to a center of the hole. Accordingly, the tool may cut some portion outside a target machining area of the workpiece, such that dimensions of the round hole cannot meet requirements. Therefore, the method for grinding the round hole of the prior art has lower machining precision.

SUMMARY OF THE INVENTION

The present invention provides a floating type machining platform comprising a base, a holding platform, a first elastic module, a second elastic module and a third elastic module. The holding platform is configured to hold a workpiece. The first elastic module is connected between the base and the holding platform along a first axis for allowing the holding platform to move along and rotate around the first axis relative to the base. The second elastic module is connected between the base and the holding platform along a second axis for allowing the holding platform to move along and rotate around the second axis relative to the base. The third elastic module is connected between the base and the holding platform along a third axis for allowing the holding platform to move along and rotate around the third axis relative to the base. Wherein, the first axis and the second axis are different horizontal axes, and the third axis is a vertical axis.

The present invention further provides a floating type machining system comprising a floating type machining platform and a machining device. The floating type machining platform comprises a base, a holding platform, a first elastic module, a second elastic module and a third elastic module. The holding platform is configured to hold a workpiece. The first elastic module is connected between the base and the holding platform along a first axis for allowing the holding platform to move along and rotate around the first axis relative to the base. The second elastic module is connected between the base and the holding platform along a second axis for allowing the holding platform to move along and rotate around the second axis relative to the base. The third elastic module is connected between the base and the holding platform along a third axis for allowing the holding platform to move along and rotate around the third axis relative to the base. The machining device is configured to machine the workpiece along the third axis. Wherein, the first axis the second axis are different horizontal axes, and the third axis is a vertical axis.

The present invention further provides a floating type machining method comprising providing a floating type machining platform, wherein the floating type machining platform comprises a base, a holding platform, a first elastic module, a second elastic module and a third elastic module, the first elastic module is connected between the base and the holding platform along a first axis for allowing the holding platform to move along and rotate around the first axis relative to the base, the second elastic module is connected between the base and the holding platform along a second axis for allowing the holding platform to move along and rotate around the second axis relative to the base, the third elastic module is connected between the base and the holding platform along a third axis for allowing the holding platform to move along and rotate around the third axis relative to the base, the first axis and the second axis are different horizontal axes, and the third axis is a vertical axis; the holding platform holding a workpiece; and machining the workpiece along the third axis.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
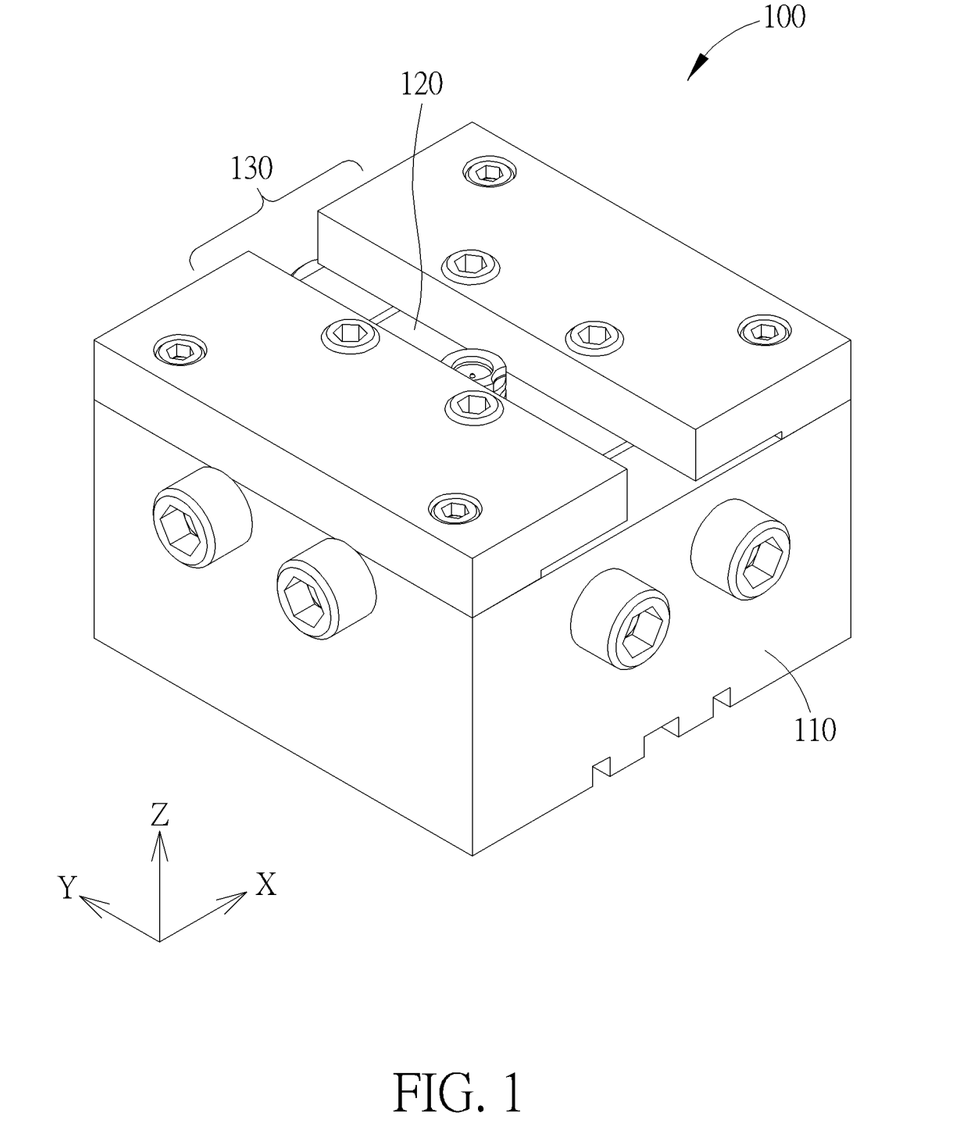
FIG. 1 is a diagram showing a floating type machining platform of the present invention.
Figure 2:
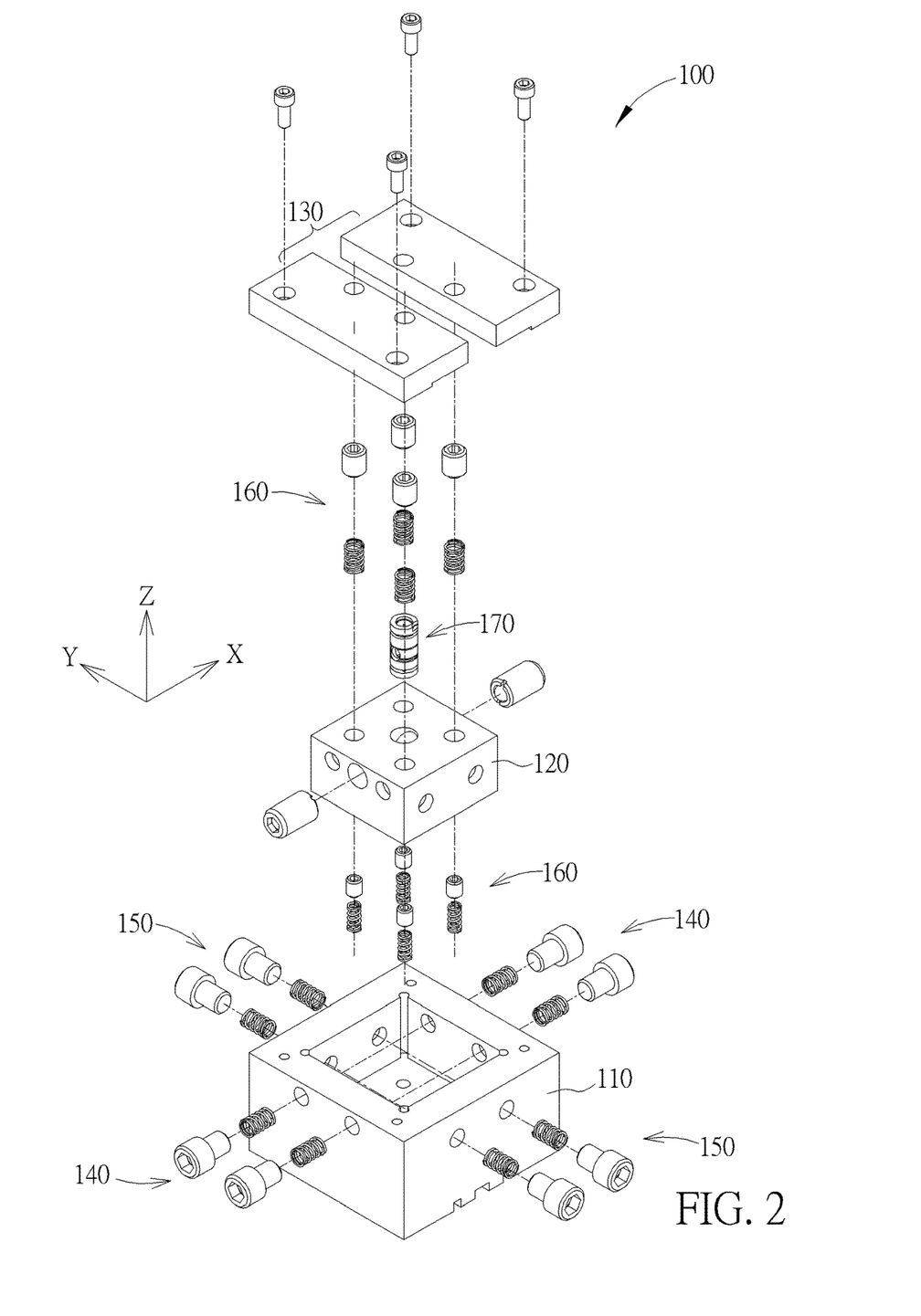
FIG. 2 is an exploded view of the floating type machining platform of the present invention.

Please refer to FIG. 1 and FIG. 2. FIG. 1 is a diagram showing a floating type machining platform of the present invention. FIG. 2 is an exploded view of the floating type machining platform of the present invention. As shown in figures, the floating type machining platform 100 of the present invention comprises a base 110, a holding platform 120, a first elastic module 140, a second elastic module 150, a third elastic module 160 and a cover 130. The holding platform 120 is configured to hold a workpiece 170. The cover 130 is connected to the base 110 and covers the holding platform 120. The first elastic module 140, the second elastic module 150 and the third elastic module 160 are configured to respectively support the holding platform 120 in order to prevent the holding platform 120 from contacting the base 110 and the cover 130. In other words, the holding platform 120 is supported in a space defined by the cover 130 and the base 110 in a floating manner.

Figure 3:
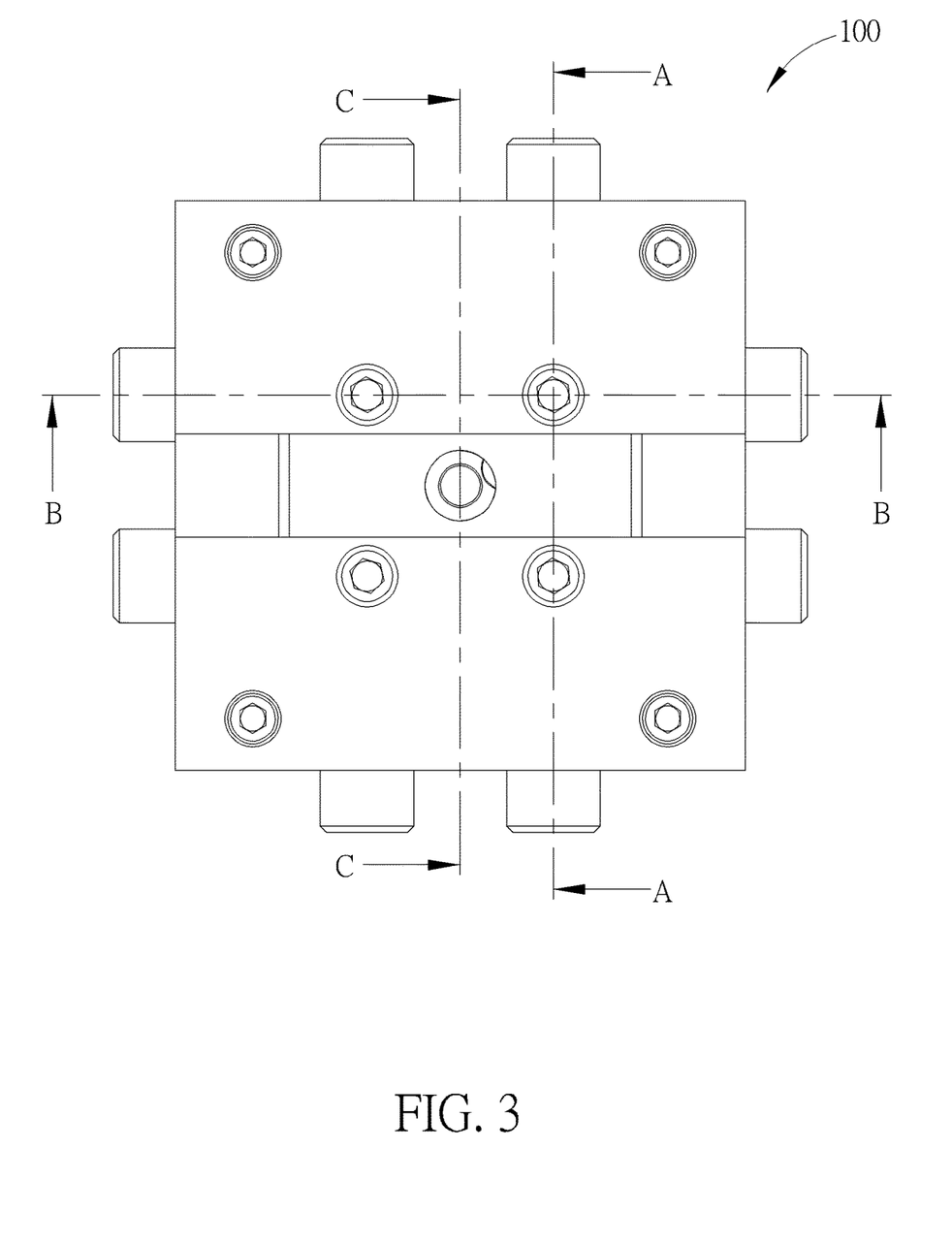
FIG. 3 is a top view of the floating type machining platform of the present invention.
Figure 4:
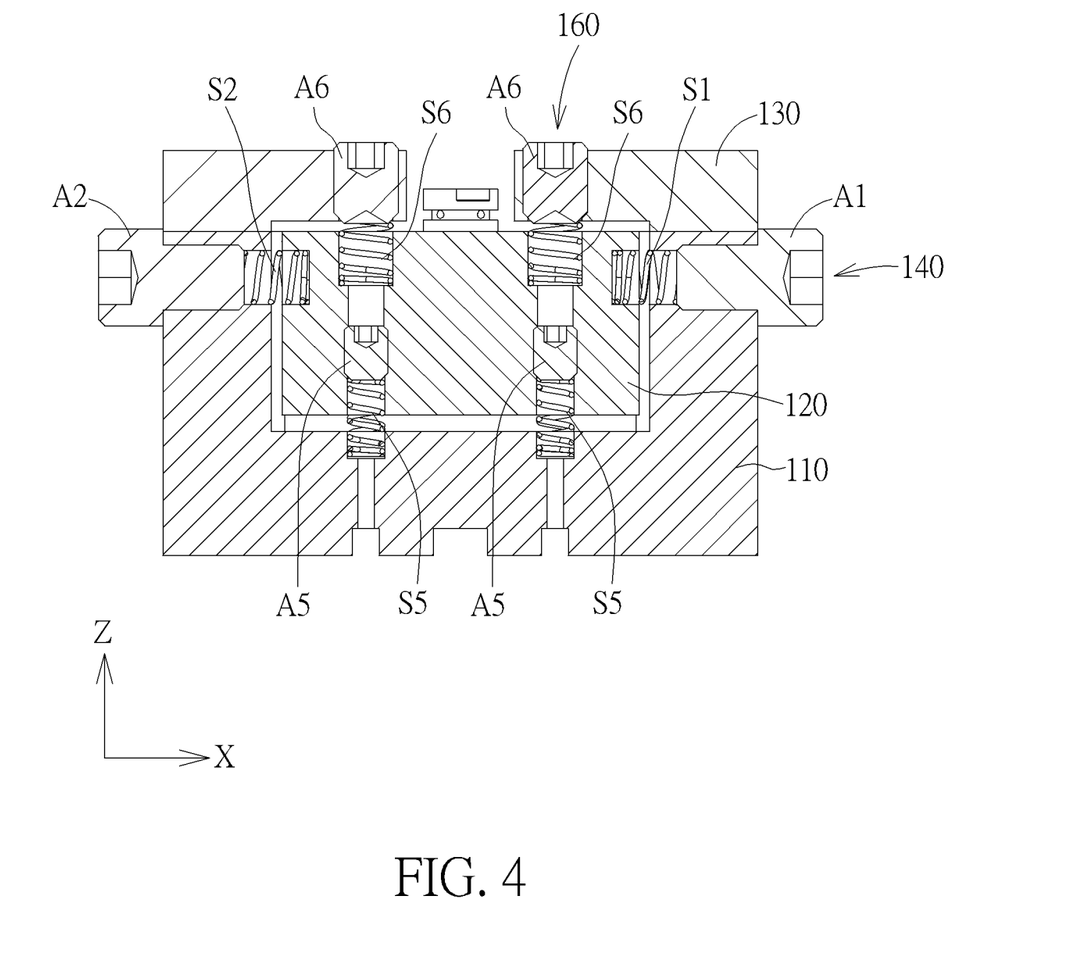
FIG. 4 is a cross-sectional view of the floating type machining platform along a cross-sectional line A-A in FIG. 3.

Please refer to FIG. 3 and FIG. 4. FIG. 3 is a top view of the floating type machining platform of the present invention. FIG. 4 is a cross-sectional view of the floating type machining platform along a cross-sectional line A-A in FIG. 3. As shown in figures, the first elastic module 140 comprises a first spring S1 and a second spring S2. The first spring S1 is connected between the base 110 and a first side of the holding platform 120 along a first axis X. The second spring S2 is connected between the base 110 and a second side of the holding platform 120 along the first axis X. The second side is opposite to the first side. As such, there are gaps formed between the base 110 and the first and second sides of the holding platform 120, so as to allow the holding platform 120 to move along the first axis X relative to the base 110. On the other hand, the first elastic module 140 can further comprise a first adjustment unit A1 and a second adjustment unit A2. The first adjustment unit A1 is configured to adjust compression of the first spring S1. The second adjustment unit A2 is configured to adjust compression of the second spring S2. The floating type machining platform 100 of the present invention can further adjust the gaps between the base 110 and the first and second sides of the holding platform 120 by the first adjustment unit A1 and the second adjustment unit A2.

Figure 5:
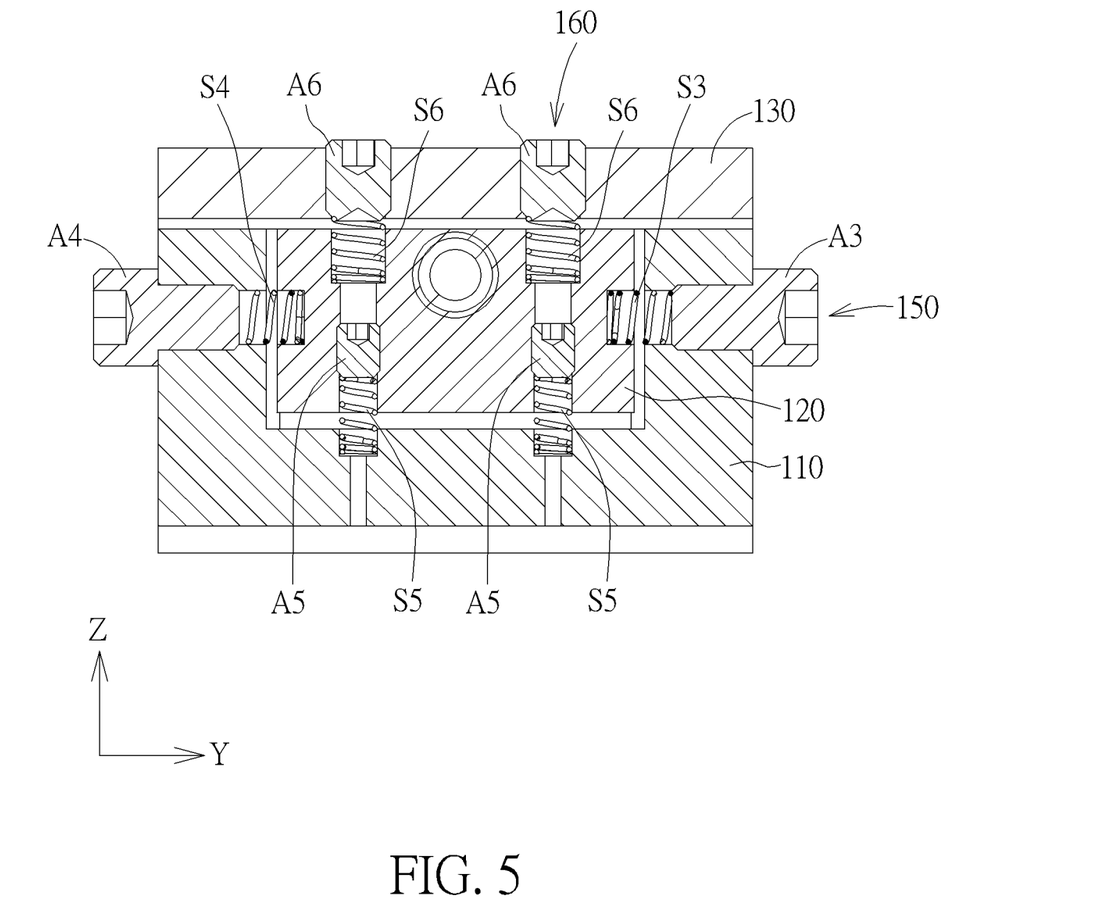
FIG. 5 is a cross-sectional view of the floating type machining platform along a cross-sectional line B-B in FIG. 3.

Please refer to FIG. 5, and refer to FIG. 3 as well. FIG. 5 is a cross-sectional view of the floating type machining platform along a cross-sectional line B-B in FIG. 3. As shown in figures, the second elastic module 150 comprises a third spring S3 and a fourth spring S4. The third spring S3 is connected between the base 110 and a third side of the holding platform 120 along a second axis Y. The fourth spring S4 is connected between the base 110 and a fourth side of the holding platform 120 along the second axis Y. The fourth side is opposite to the third side. As such, there are gaps formed between the base 110 and the third and fourth sides of the holding platform 120, so as to allow the holding platform 120 to move along the second axis Y relative to the base 110. On the other hand, the second elastic module 150 can further comprise a third adjustment unit A3 and a fourth adjustment unit A4. The third adjustment unit A3 is configured to adjust compression of the third spring S3. The fourth adjustment unit A4 is configured to adjust compression of the fourth spring S4. The floating type machining platform 100 of the present invention can further adjust the gaps between the base 110 and the third and fourth sides of the holding platform 120 by the third adjustment unit A3 and the fourth adjustment unit A4.

In addition, the third elastic module 160 comprises a fifth spring S5 and a sixth spring S6. The fifth spring S5 is connected between the base 110 and a fifth side of the holding platform 120 along a third axis Z. The sixth spring S6 is connected between the cover 130 and a sixth side of the holding platform 120 along the third axis Z. The sixth side is opposite to the fifth side. As such, a gap is formed between the base 110 and the fifth side of the holding platform 120, and a gap is formed between the cover 130 and the sixth side of the holding platform 120, so as to allow the holding platform 120 to move along the third axis Z relative to the base 110. On the other hand, the third elastic module 160 can further comprise a fifth adjustment unit A5 and a sixth adjustment unit A6. The fifth adjustment unit A5 is configured to adjust compression of the fifth spring S5. The sixth adjustment unit A6 is configured to adjust compression of the sixth spring S6. The floating type machining platform 100 of the present invention can further adjust the gap between the base 110 and the fifth side of the holding platform 120 and the gap between the cover 130 and the sixth side of the holding platform 120 by the fifth adjustment unit A5 and the sixth adjustment unit A6.

On the other hand, since there are gaps formed between the first to sixth sides of the holding platform 120 and the base 110 and the cover 130, the holding platform 120 can further rotate around the first axis X, the second axis Y and the third axis Z relative to the base 110.

In the present embodiment of the present invention, the first axis X and the second axis Y are horizontal axes. The third axis Z is a vertical axis. The first axis X, the second axis Y and the third axis Z are perpendicular to each other. However, in other embodiments of the present invention, the first axis X and the second axis Y can be different horizontal axes without being perpendicular to each other.

Figure 6:
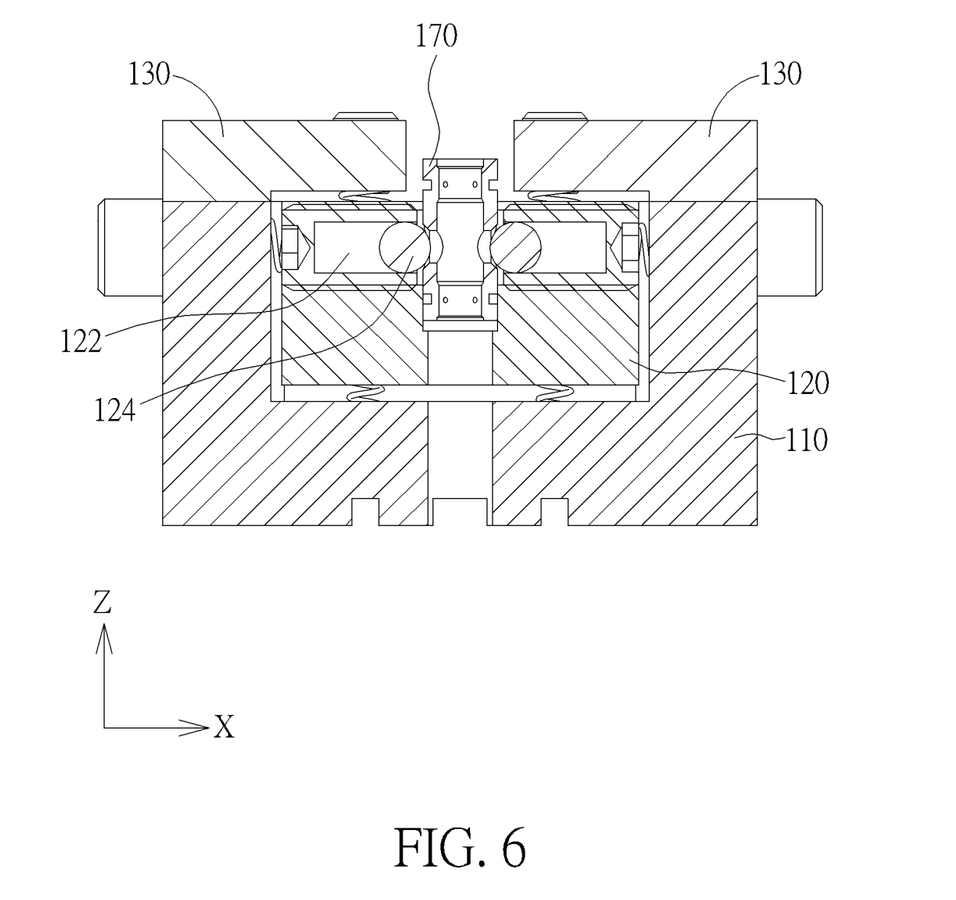
FIG. 6 is a cross-sectional view of the floating type machining platform along a cross-sectional line C-C in FIG. 3.

Please refer to FIG. 6, and refer to FIG. 3 as well. FIG. 6 is a cross-sectional view of the floating type machining platform along a cross-sectional line C-C in FIG. 3. As shown in figures, the holding platform 120 comprises a holding unit 122 configured to hold the workpiece 170. The holding unit 122 can hold the workpiece 170 by using a holding structure corresponding to a shape of the workpiece 170. For example, the holding unit 122 can hold the workpiece 170 by using a spherical holding structure 124 to abut against a recessed portion of the workpiece 170. In the above embodiment, the holding structure of the holding unit is only illustrated for example. The present invention is not limited by it.

According to the above arrangement, when the holding platform 120 holds the workpiece 170, the workpiece 170 can linearly move along and rotates around the first axis X, the second axis Y and the third axis Z along with the holding platform 120 in a floating manner. In other words, the floating type machining platform 100 of the present invention can allow the holding platform 120 to freely perform six-axis motion (three linear axes and three rotary axes) by only using the single base 110 to support the holding platform 120. In the prior art, a plurality of bases for linear movement and rotational movement are required to be stacked on each other for supporting a holding platform to perform the six-axis motion (linearly moving along the first axis X, the second axis Y and the third axis Z, and rotating around the first axis X, the second axis Y and the third axis Z). In contrast to the prior art, the holding platform 120 of the present invention has a simpler structure and is space-saving.

On the other hand, in the above embodiment, the first to sixth adjustment units A1-A6 are illustrated as screws for example. But the present invention is not limited thereto. The first to sixth adjustment units A1-A6 can be elements in other types for respectively adjusting the compression of the first to sixth springs S1-S6.

Figure 7:
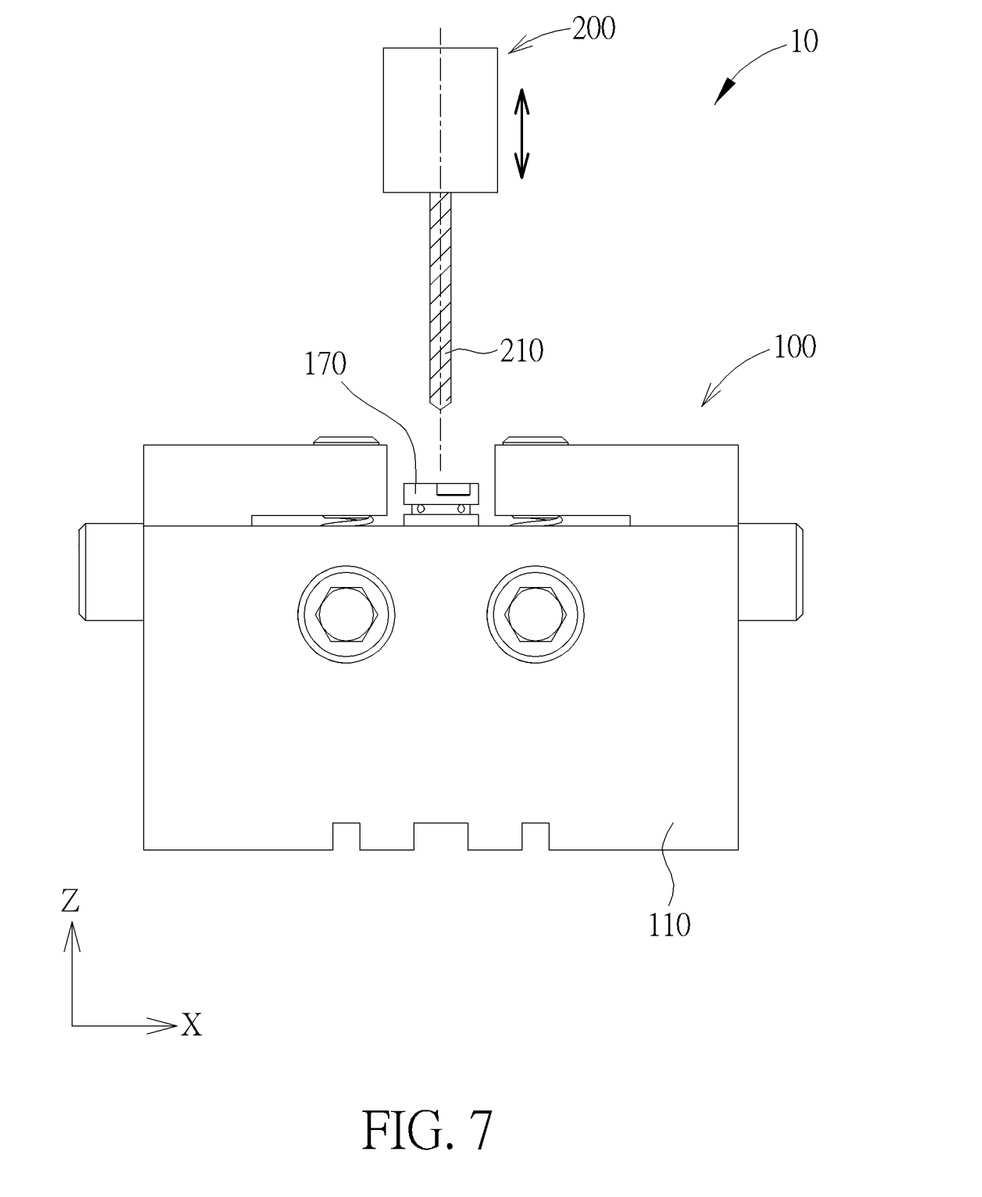
FIG. 7 is a diagram showing a floating type machining system of the present invention.
Figure 8:
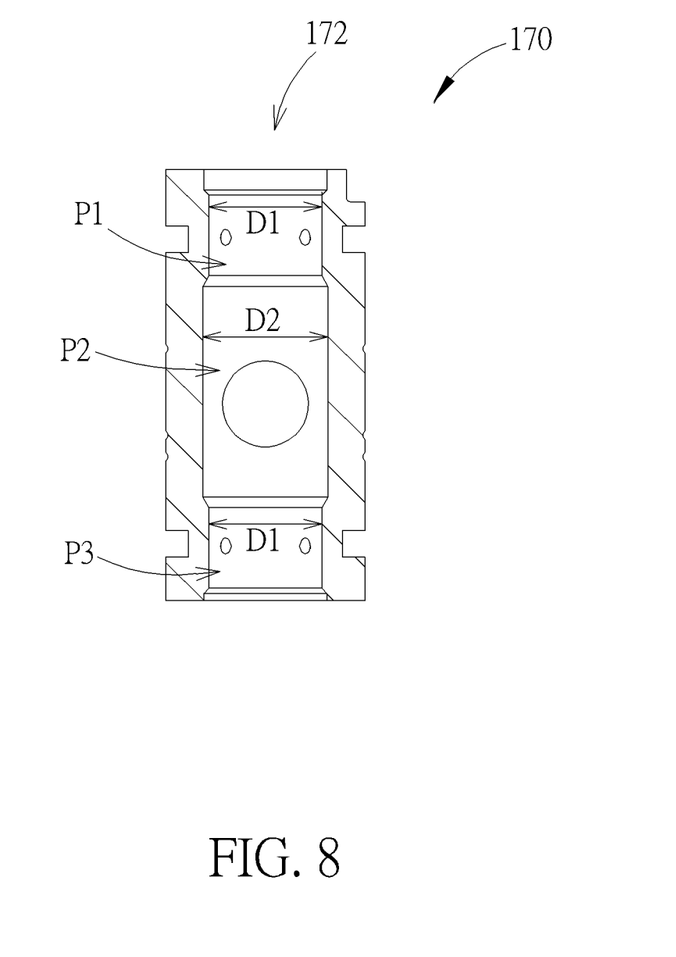
FIG. 8 is a diagram showing a workpiece of the present invention.

Please refer to FIG. 7 and FIG. 8. FIG. 7 is a diagram showing a floating type machining system of the present invention. FIG. 8 is a diagram showing the workpiece of the present invention. As shown in figures, the floating type machining system 10 of the present invention comprises the floating type machining platform 100 and a machining device 200. In the present embodiment of the present invention, the workpiece 170 is a floating bearing, and a through hole 172 is formed on the workpiece 170. The through hole 172 has a first part P1, a second part P2 and a third part P3. The first part P1 and the third part P3 of the through hole 172 are respectively located at two ends of the workpiece 170, and each of the first part and the third part has a first diameter D1. The second part P2 of the workpiece 170 communicates with the first part P1 and the third part P3 and has a second diameter D2. The second diameter D2 is larger than the first diameter D1. When the machining device 200 is used to grind the first part P1 and the third part P3 of the through hole 172, an axis of a tool 210 of the machining device 200 is aligned to a center of the through hole 172 first, and then the tool 210 of the machining device 200 is fed along the third axis Z in order to grind the first part P1 and the third part P3 of the through hole 172. Since the workpiece 170 can linearly move along and rotate around the first axis X, the second axis Y and the third axis Z along with the holding platform 120 in a floating manner, when the tool 210 of the machining device 200 is fed along the third axis Z, the holding platform 120 can compensate deviation of the tool 210 in order to prevent the tool 210 from grinding the second part P2 of the through hole 172 due to deviation of the tool 210. Moreover, since the workpiece 170 is placed vertically, the workpiece is not easy to tilt, so as to further reduce machining errors. In the above embodiment, the structure of the workpiece 170 is illustrated for example, the present is not limited thereto. The floating type machining system 10 of the present invention can be used to machine a workpiece in other forms.

On the other hand, in other embodiments of the present invention, the floating type machining platform can only comprise the base 110, the holding platform 120 and the first to fifth springs S1-S5 for allowing the holding platform 120 to be supported on the base 110 in a floating manner. The cover 130, the sixth spring S6 and the first to sixth adjustment units A1-A6 can be selectively disposed on the floating type machining platform according to design requirements.

Figure 9:
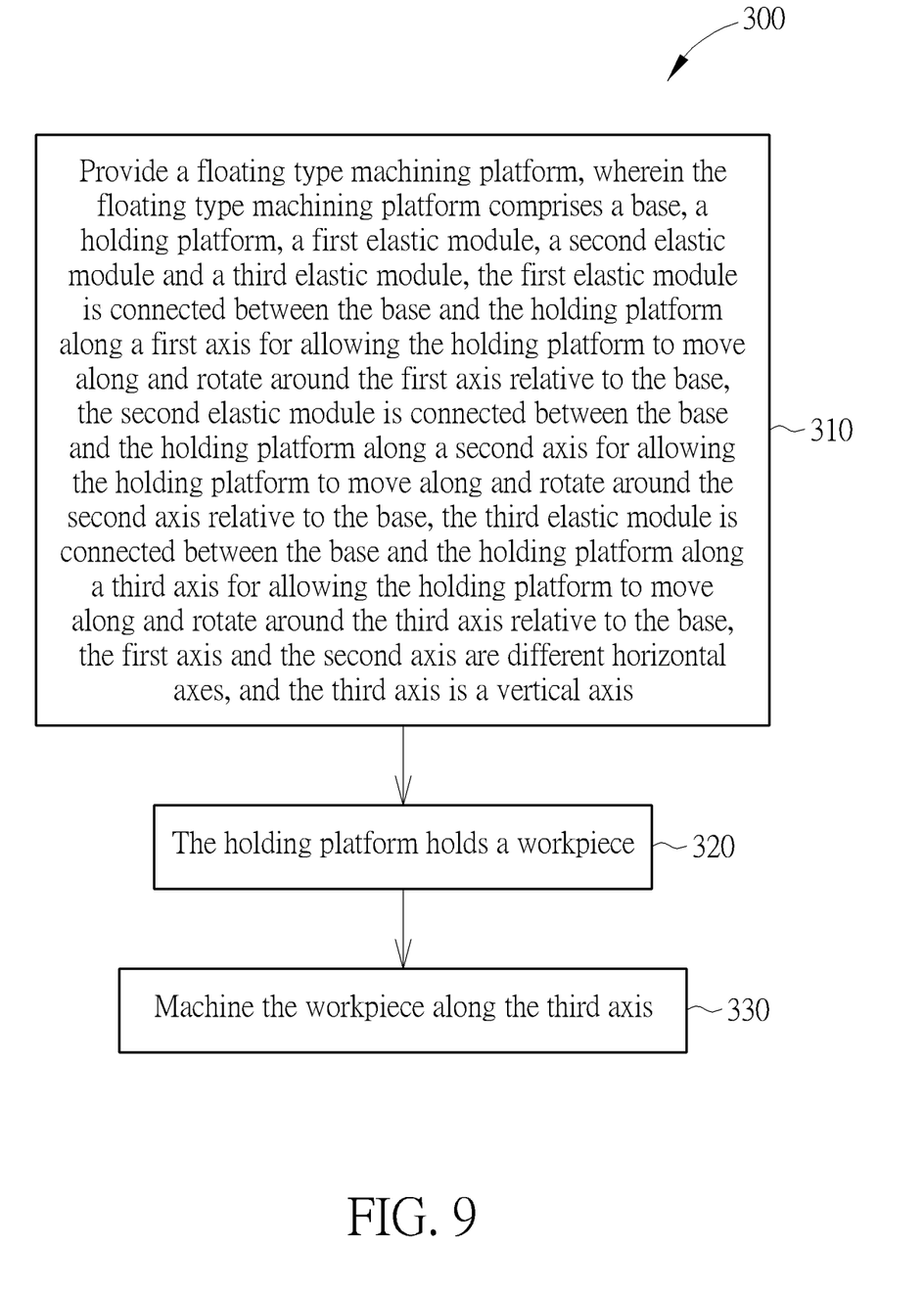
FIG. 9 is a flowchart showing a floating type machining method of the present invention.

Please refer to FIG. 9. FIG. 9 is a flowchart 300 showing a floating type machining method of the present invention. The flowchart of the floating type machining method of the present invention comprises the following steps:

Step 310: Provide a floating type machining platform, wherein the floating type machining platform comprises abase, a holding platform, a first elastic module, a second elastic module and a third elastic module, the first elastic module is connected between the base and the holding platform along a first axis for allowing the holding platform to move along and rotate around the first axis relative to the base, the second elastic module is connected between the base and the holding platform along a second axis for allowing the holding platform to move along and rotate around the second axis relative to the base, the third elastic module is connected between the base and the holding platform along a third axis for allowing the holding platform to move along and rotate around the third axis relative to the base, the first axis and the second axis are different horizontal axes, and the third axis is a vertical axis;

Step 320: The holding platform holds a workpiece; and

Step 330: Machine the workpiece along the third axis.

In contrast to the prior art, the holding platform of the floating type machining platform of the present invention is supported in the space defined by the cover and the base in a floating manner, in order to allow the workpiece to linearly move along and rotate around the horizontal axes and the vertical axis along with the holding platform. Therefore, the floating type machining platform of the present invention can compensate the deviation of the tool. Moreover, since the workpiece is placed and machined along the vertical direction, machining errors caused by tilt of the workpiece can be further prevented. Therefore, the floating type machining platform, the floating type machining system and the floating type machining method of the present invention is capable of improving machining precision.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A floating type machining platform, comprising:
   a base;
   a holding platform configured to hold a workpiece;
   a first elastic module connected between the base and the holding platform along a first axis for allowing the holding platform to move along and rotate around the first axis relative to the base;
   a second elastic module connected between the base and the holding platform along a second axis for allowing the holding platform to move along and rotate around the second axis relative to the base; and
   a third elastic module is connected between the base and the holding platform along a third axis for allowing the holding platform to move along and rotate around the third axis relative to the base;
   wherein the first axis and the second axis are different horizontal axes, and the third axis is a vertical axis;
   wherein the first elastic module comprises a first spring connected between the base and a first side of the holding platform, and a second spring connected between the base and a second side of the holding platform, the second side is opposite to the first side;
   wherein the second elastic module comprises a third spring connected between the base and a third side of the holding platform, and a fourth spring connected between the base and a fourth side of the holding platform, the fourth side is opposite to the third side;
   wherein the third elastic module comprises a fifth spring connected between the base and a fifth side of the holding platform, the fifth side is adjacent to the first side, the second side, the third side and the fourth side;
   wherein the floating type machining platform further comprises a cover connected to the base and covering a sixth side of the holding platform, the sixth side is opposite to the fifth side, the third elastic module further comprises a sixth spring connected between the cover and the sixth side of the holding platform, the holding platform does not contact the cover.

2. The floating type machining platform of claim 1, wherein the holding platform does not contact the base.

3. The floating type machining platform of claim 1, wherein the first axis, the second axis, and the third axis are perpendicular to each other.

4. The floating type machining platform of claim 1, wherein:
   the first elastic module further comprises a first adjustment unit configured to adjust compression of the first spring, and a second adjustment unit configured to adjust compression of the second spring;
   the second elastic module further comprises a third adjustment unit configured to adjust compression of the third spring, and a fourth adjustment unit configured to adjust compression of the fourth spring; and
   the third elastic module further comprises a fifth adjustment unit configured to adjust compression of the fifth spring, and a sixth adjustment unit configured to adjust compression of the sixth spring.

5. A floating type machining system comprising:
a floating type machining platform comprising:
   a base;
   a holding platform configured to hold a workpiece;
   a first elastic module connected between the base and the holding platform along a first axis for allowing the holding platform to move along and rotate around the first axis relative to the base;
   a second elastic module connected between the base and the holding platform along a second axis for allowing the holding platform to move along and rotate around the second axis relative to the base; and
   a third elastic module connected between the base and the holding platform along a third axis for allowing the holding platform to move along and rotate around the third axis relative to the base; and
a machining device configured to machine the workpiece along the third axis;
wherein the first axis and the second axis are different horizontal axes, and the third axis is a vertical axis;
wherein the first elastic module comprises a first spring connected between the base and a first side of the holding platform, and a second spring connected between the base and a second side of the holding platform, the second side is opposite to the first side;
wherein the second elastic module comprises a third spring connected between the base and a third side of the holding platform, and a fourth spring connected between the base and a fourth side of the holding platform, the fourth side is opposite to the third side;
wherein the third elastic module comprises a fifth spring connected between the base and a fifth side of the holding platform, the fifth side is adjacent to the first side, the second side, the third side and the fourth side;
wherein the floating type machining system further comprises a cover connected to the base and covering a sixth side of the holding platform, the sixth side is opposite to the fifth side, the third elastic module further comprises a sixth spring connected between the cover and the sixth side of the holding platform, the holding platform does not contact the cover.

6. The floating type machining system of claim 5, wherein the holding platform does not contact the base.

7. The floating type machining system of claim 5, wherein the first axis, the second axis, and the third axis are perpendicular to each other.

8. The floating type machining system of claim 5, wherein:
   the first elastic module further comprises a first adjustment unit configured to adjust compression of the first spring, and a second adjustment unit configured to adjust compression of the second spring;
   the second elastic module further comprises a third adjustment unit configured to adjust compression of the third spring, and a fourth adjustment unit configured to adjust compression of the fourth spring; and
   the third elastic module further comprises a fifth adjustment unit configured to adjust compression of the fifth spring, and a sixth adjustment unit configured to adjust compression of the sixth spring.

9. The floating type machining system of claim 5, wherein a through hole is formed on the workpiece, and the through hole comprises a first part, a second part and a third part, the first part and the third part are respectively located at two ends of the workpiece and each of the first part and the third part has a first diameter, the second part communicates with the first part and the third part and has a second diameter, the second diameter is larger than the first diameter, the machining device is configured to machine the first part and the third part of the through hole along the third axis.

* * * * *